Patented Aug. 26, 1952

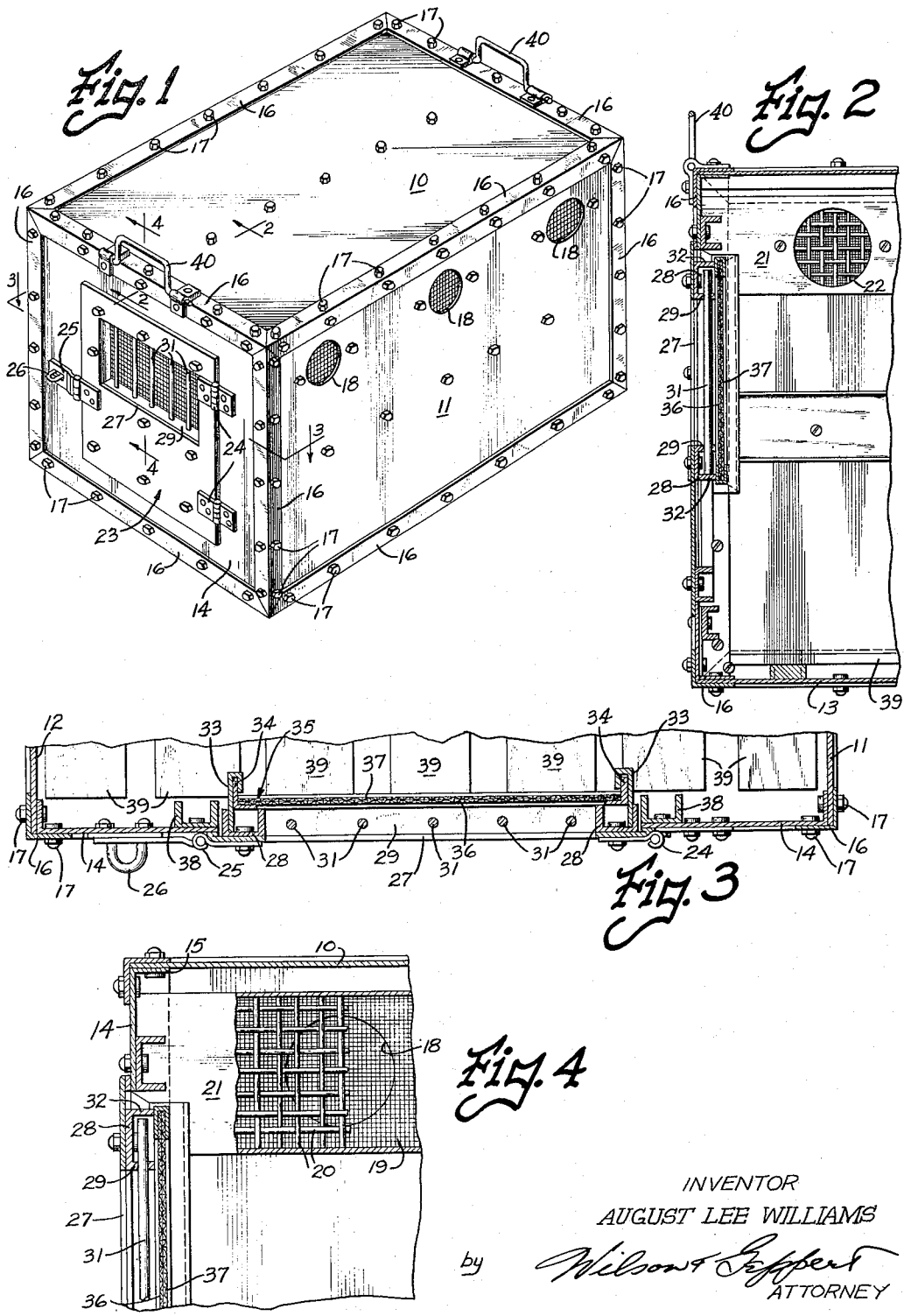

2,608,248

UNITED STATES PATENT OFFICE 2,608,248

DOOR CONSTRUCTION FOR ANIMAL SHIPPING CRATES

August Lee Williams, Chicago, Ill.

Original application April 8, 1948, Serial No. 19,793, now Patent No. 2,534,492, dated December 19, 1950. Divided and this application November 4, 1950, Serial No. 194,053

5 Claims. (Cl. 160—92)

The present invention relates to shipping crates or containers for the transportation of animals such as dogs, cats, etc., and especially to a novel door or closure for such a crate or container.

Among the objects of the present invention is the provision of a strong, durable and comfortable crate or container having a novel door or closure by which the animal is securely retained and protected from bodily injury and the attacks of insects while enclosed and during shipment, as well as from the attentions of unauthorized persons, but also from which the animal cannot escape or attack anyone or do other damage.

The present invention further comprehends the provision of a novel door or closure for an animal shipping crate or container provided with a screened and barred opening that permits adequate ventilation yet protects the caged animal from being molested by insects as well as by unauthorized persons. The novel door or closure is provided with a framed screen adapted to cover the opening and slidably and removably mounted in channel guides whereby the screen may be easily and readily inserted or removed from the interior of the door.

This application is a division of my copending application Serial No. 19,793, filed April 8, 1948, now Patent No. 2,534,492, granted December 19, 1950.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawing:

Figure 1 is an isometric or perspective view of the crate or container equipped with the present novel door or closure.

Fig. 2 is a fragmentary enlarged view in vertical cross section taken in a plane represented by the line 2—2 of Fig. 1.

Fig. 3 is a fragmentary enlarged view in horizontal cross section taken in a plane represented by the line 3—3 of Fig. 1.

Fig. 4 is a fragmentary enlarged view in vertical cross section taken in a plane represented by the line 4—4 of Fig. 1.

Referring more particularly to the disclosure in the drawing and to the novel illustrative embodiment therein shown, the crate or container comprises a top wall 10, side walls 11 and 12 and a bottom wall 13 constructed of a single sheet of sheet metal, preferably aluminum, magnesium or an alloy of one of these metals, the ends of the sheet preferably being brought together in substantially abutting relation along the center of the bottom wall and thereat secured together in any suitable manner.

The rear wall (not shown) and the front wall 14 are similarly constructed of light sheet metal provided with inwardly turned edges providing flanges 15 extending perimetrically thereabout for underlapping the front end edges of the top, side and bottom walls. Thus the front and rear walls have flanges which telescope within the ends of the container or crate and thereby serve to strengthen both the end walls and the side, top and bottom walls at the ends.

Along each juncture of two walls, that is, along each corner edge formed by the juncture of one wall with another, is an L-shaped or angle shaped light sheet metal reinforcing strip such as indicated at 16 which may be secured to the top, side, bottom and end walls, as the case may be, by a plurality of bolts 17 arranged at spaced intervals on each side of the juncture between the walls. If desired, other securing means such as rivets or welds may be substituted for the bolts 17. At the juncture of the top, side and bottom walls at each end the bolts or other securing means 17 not only pass through the angle reinforcing strips 16 and the adjacent wall, but also through the flanges 15, thereby simultaneously to secure the end walls to the adjacent walls and to the reinforcing angle corner strips. This provides a very strong and relatively rigid structure.

In order to provide adequate ventilation for the animal in the crate, the side walls 11 and 12 and the rear end wall, are provided with apertures 18 here shown of circular shape, but which may be of any desired configuration. Each aperture is screened with both fine mesh screening 19, such as the ordinary fly screen to keep out insects and the like, and with coarse heavy mesh screening 20 to prevent injury to the fine mesh screen, the coarse being placed to the inside of the fine mesh screen since there is more likelihood of injury to the latter by reason of the animal scratching than there is from external forces. Conveniently, a sheet metal strip 21 having apertures 22 adapted to register with the apertures 18 serves as a screen carrier, to this end having its longitudinal margins turned in against a length or lengths of screening, thereby to clamp the screening in place. Bolts or other securing means secure the metal strips 21 in place and firmly to the sides and rear end walls. Cross ventilation is established between similar spaced apertures in the end walls and a screened and barred opening in a door 23 in the front wall.

The door 23 is constructed from sheet metal and provided with hinges 24 which may be riveted or otherwise secured thereto and to the wall 14. A hinged hasp 25 secured to the door and a staple 26 secured to the wall 14 and a padlock (not shown) provide one means by which the door may be secured against unauthorized opening. In the upper portion of the door is a rectangular aperture or opening 27, the margins of which are reinforced by sheet metal channels 28 bolted, riveted or welded to the metal door 23. Along the upper edge and the bottom edge of the aperture or opening 27 those side flanges 29 of the channels 28 are perforated or drilled for the passage of the ends of rigid steel or other metal bars 31 arranged in parallel spaced relation vertically across the aperture or opening 27. The ends of these bars 31 extend into contact with or into close proximity to those flanges 32 of the channels 28 which are farthest from the margin of the opening 27, and when the top and bottom channels 28 are secured to the door the bars are fixed firmly in position.

The door opening or aperture 27 must also be screened for the same reason that the apertures 18 were screened, but in this case it is preferable to have the screen readily removable. To this end channel guide members 33 extending parallel to one another at the opposite sides of the opening or aperture 27 and suitably secured to those flanges of channels 28 which are the farthest or most remote from the door opening, are arranged to receive flanges 34 forming the side edges of a frame 35 in which a compound screen including a fine mesh screen 36 and a coarse mesh screen 37 is secured. When the door is opened the screen may be raised or removed by sliding the screen upwardly in the channels or guide members 33. A suitable stop may be secured to the bottoms of the channels or guide members 33 or otherwise to prevent the screen from dropping below a predetermined position. The opening in the end wall for the door may be suitably framed on all four sides of the door by channel members 38 secured by bolts, rivets or welding after the manner previously described.

In order to protect the animal from debris accumulating on the floor of the crate, a slat floor 39, removable through the door opening, has been provided. A carrying handle 40 at each end of the top of the crate and suitably secured as by rivets or otherwise, permits the crate to be handled very easily.

It will be apparent from the foregoing that I have provided a novel door or closure for a strong and durable crate or cage particularly valuable for shipping animals. It affords protection from flies and other insects, prevents unauthorized persons from feeding or annoying the animal within the crate and affords protection from accidental injury to the animal therein.

Since various changes and rearrangements of parts may be made without departing from the invention spirit, I desire to be limited only by the scope of the appended claims.

Having thus disclosed the invention, I claim:

1. In an animal shipping crate of the character described, a ventilated-door construction comprising, a door formed of sheet metal having an opening therein, reinforcing members including a pair of spaced flanges substantially perpendicular to the plane of the door substantially surrounding said opening at and secured to the inside face of the door, a plurality of rigid bars extending in spaced parallel relation to one another across said opening and having their ends disposed through those oppositely disposed flanges which are nearest to said opening and into close proximity to those oppositely disposed flanges which are most remote from said opening, a screen including a frame carried by said door at the inside face thereof over and in close proximity to said opening, and means mounting said screen and its frame on said door for movements between a position uncovering said opening and a position covering the same.

2. In an animal shipping crate of the character described, a ventilated-door construction comprising, a door formed of sheet metal having an opening therein, reinforcing members of channel shape having their side flanges substantially perpendicular to the plane of the door, said members substantially surrounding said opening at and secured to the inside face of the door, a plurality of rigid bars extending in spaced parallel relation to one another across said opening and having their ends disposed through those oppositely disposed flanges which are nearest to said opening and into close proximity to those oppositely disposed flanges which are most remote from said opening, a screen including a frame carried by said door at the inside face thereof over and in close proximity to said opening, and means carried by certain of said channel members for mounting said screen and its frame for movements between a position uncovering said opening and a position covering the same.

3. In an animal shipping crate of the character described, a ventilated door construction comprising a door formed of sheet metal having an opening therein, reinforcing members having spaced flanges surrounding said opening at and secured to the inside face of the door, channel guide members carried by said reinforcing members and a screen including a frame slidably and removably carried by said channel guide members at the inside face of the door and in close proximity to and covering said opening.

4. In an animal shipping crate of the character described, a ventilated door construction comprising a door formed of sheet metal having an opening therein, channel members at the top, bottom and opposite sides of the opening on the interior of the door and encompassing the same thereat reinforcing the door, an opposite pair of said channel members having spaced openings in one of the flanges thereof and a plurality of rigid bars extending across the opening and carried by and having their ends anchored in the channel members, the ends of these bars projecting through said spaced openings.

5. In an animal shipping crate of the character described, a ventilated door construction comprising a door formed of sheet metal having an opening therein, channel members encompassing the opening on the interior of the door for reinforcing the same, guide members disposed at the interior of the door and carried by the channel members, a frame slidably carried by the guide members of the door at the interior of the bars and provided with a fine and a coarse mesh screen mounted in the frame, and means on said guide members for slidably and removably mounting the frame and screens upon the interior of the door.

AUGUST LEE WILLIAMS.

REFERENCES CITED

The following references are of record in the file of this patent:

UNITED STATES PATENTS

| Number | Name | Date |
|---|---|---|
| 1,449,428 | McGaffee | Mar. 27, 1923 |
| 1,866,882 | Dixson | July 12, 1932 |
| 2,314,230 | Lunken | Mar. 16, 1943 |
| 2,470,223 | Powels | May 17, 1949 |